(12) United States Patent
Farris et al.

(10) Patent No.: US 11,867,069 B2
(45) Date of Patent: Jan. 9, 2024

(54) HYBRID ELECTRIC VARIABLE AREA TURBINE

(71) Applicant: RTX Corporation, Farmington, CT (US)

(72) Inventors: John R. Farris, Lebanon, CT (US); Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/360,480

(22) Filed: Jun. 28, 2021

(65) Prior Publication Data

US 2022/0412272 A1 Dec. 29, 2022

(51) Int. Cl.
*F01D 17/16* (2006.01)
*F01D 17/24* (2006.01)

(52) U.S. Cl.
CPC .............. *F01D 17/16* (2013.01); *F01D 17/24* (2013.01); *F05D 2220/323* (2013.01); *F05D 2220/76* (2013.01); *F05D 2270/62* (2013.01)

(58) Field of Classification Search
CPC ........ F01D 17/14; F01D 17/16; F01D 17/162; F01D 17/24; F05D 2220/76; F05D 2270/62
See application file for complete search history.

(56) References Cited

U.S. PATENT DOCUMENTS

| | | | |
|---|---|---|---|
| 5,867,979 A | 2/1999 | Newton et al. | |
| 10,196,923 B2* | 2/2019 | Thomassin | F02C 3/10 |
| 10,221,730 B2 | 3/2019 | Adams et al. | |
| 10,253,648 B2* | 4/2019 | Bentley | F01D 17/085 |
| 2010/0000223 A1 | 1/2010 | Colotte et al. | |
| 2010/0247293 A1* | 9/2010 | McCaffrey | F01D 9/041 |
| | | | 415/160 |

(Continued)

FOREIGN PATENT DOCUMENTS

EP 3708803 A1 9/2020

OTHER PUBLICATIONS

Extended European Search Report for EP Application No. 22181383.5; dated Nov. 17, 2022, (6 pages).

*Primary Examiner* — David E Sosnowski
*Assistant Examiner* — Jackson N Gillenwaters
(74) *Attorney, Agent, or Firm* — CANTOR COLBURN LLP

(57) ABSTRACT

A hybrid electric engine including a gas turbine engine including a low speed spool, a high speed spool a fan section, a compressor section, a combustor section, and a turbine section. The hybrid electric engine further includes an electric generator configured to convert rotational power of the high or low speed spool to electricity and a variable area turbine control system electrically connected to the electric generator. The variable area turbine control system being configured to adjust a cross-sectional area of a core flow path of the hybrid electric engine. The variable area turbine control system including a plurality of variable turbine vanes located in the turbine section and a variable area turbine actuator configured to rotate each of the plurality of variable turbine vanes to adjust the cross-sectional area of the core flow path of the hybrid electric engine. The variable area turbine actuator is an electromechanical actuator.

8 Claims, 6 Drawing Sheets

(56) References Cited

U.S. PATENT DOCUMENTS

| | | | |
|---|---|---|---|
| 2016/0348529 A1* | 12/2016 | Emmons | F02C 9/20 |
| 2016/0369745 A1 | 12/2016 | Mueller et al. | |
| 2019/0063333 A1* | 2/2019 | Bengea | G06F 9/455 |
| 2019/0322379 A1* | 10/2019 | Mackin | F02C 7/057 |
| 2020/0031480 A1* | 1/2020 | Baig | B60L 58/20 |
| 2020/0347743 A1* | 11/2020 | Long | B64D 27/02 |
| 2020/0362768 A1* | 11/2020 | Jan | F01D 17/16 |

\* cited by examiner

HYBRID ELECTRIC VARIABLE AREA TURBINE

BACKGROUND

The subject matter disclosed herein relates generally to hybrid electric engines and, more particularly, to a method and an apparatus for control of a variable area turbine with a hybrid electric engine.

It is desirable to vary the cross-sectional area of a core of an engine during engine operation. Current systems can include pneumatic actuators that adjust cross-sectional areas of the core flow in the compressor section of the gas turbine engine. However, pneumatic actuators can add extra weight and/or cost that offset the corresponding improvements to engine efficiency and adjusting core flow in the compressor section is not always ideal.

BRIEF DESCRIPTION

According to one embodiment, a hybrid electric engine is provided. The hybrid electric engine including a gas turbine engine including a low speed spool, a high speed spool a fan section, a compressor section, a combustor section, and a turbine section. The low speed spool including a low pressure compressor and a low pressure turbine, and the high speed spool including a high pressure compressor and a high pressure turbine. The hybrid electric engine further includes an electric generator configured to convert rotational power of the high speed spool or the low speed spool to electricity and a variable area turbine control system electrically connected to the electric generator. The variable area turbine control system being configured to adjust a cross-sectional area of a core flow path of the hybrid electric engine. The variable area turbine control system including a plurality of variable turbine vanes located in the turbine section and a variable area turbine actuator configured to rotate each of the plurality of variable turbine vanes to adjust the cross-sectional area of the core flow path of the hybrid electric engine. The variable area turbine actuator is an electromechanical actuator.

In addition to one or more of the features described above, or as an alternative, further embodiments may include a power source electrically connected to the electric generator and the variable area turbine control system, wherein the variable area turbine control system is electrically connected to the electric generator through the power source.

In addition to one or more of the features described above, or as an alternative, further embodiments may include that the power source is at least one of the following: a battery; a capacitor; a supercapacitor; and an ultracapacitor.

In addition to one or more of the features described above, or as an alternative, further embodiments may include that the variable area turbine control system is directly electrically connected to the electric generator.

In addition to one or more of the features described above, or as an alternative, further embodiments may include a controller operably coupled to the electric generator and the variable area turbine control system, wherein the controller is configured to operate the variable area turbine control system.

In addition to one or more of the features described above, or as an alternative, further embodiments may include that the controller is a full authority digital engine control (FADEC).

In addition to one or more of the features described above, or as an alternative, further embodiments may include a power source electrically connected to the electric generator, the variable area turbine control system, and the controller, wherein the variable area turbine control system is electrically connected to the electric generator through the power source In addition to one or more of the features described above, or as an alternative, further embodiments may include that the controller is a FADEC.

In addition to one or more of the features described above, or as an alternative, further embodiments may include that the electric generator is connected to an engine accessory gearbox that is operably coupled to the high speed spool.

In addition to one or more of the features described above, or as an alternative, further embodiments may include that the electric generator is connected to an engine accessory gearbox that is operably coupled to the low speed spool.

In addition to one or more of the features described above, or as an alternative, further embodiments may include that the variable area turbine actuator is configured to be powered only by electricity generated by the electric generator.

According to another embodiment, a method for managing airflow through a core flow path of a hybrid electric engine for an aircraft is provided. The method includes converting, using an electric generator, rotational power of a high speed spool of the hybrid electric engine or a low speed spool of the hybrid electric engine to electricity and providing power to a variable area turbine control system. The variable area turbine control system including: a plurality of variable turbine vanes located in a turbine section of the hybrid electric engine and a variable area turbine actuator. The method also includes rotating, using the variable area turbine actuator, each of the plurality of variable turbine vanes to adjust a cross-sectional area of the core flow path of the hybrid electric engine. The variable area turbine actuator is an electromechanical actuator.

In addition to one or more of the features described above, or as an alternative, further embodiments may include delivering enough fuel to the hybrid electric engine during a taxi of the aircraft to maintain a minimum fuel flow requirement for the hybrid electric engine; and rotating, using the variable area turbine actuator, each of the plurality of variable vanes to decrease the cross-sectional area of the core flow path through the turbine section of the hybrid electric engine to spoil engine thrust from the hybrid electric engine.

In addition to one or more of the features described above, or as an alternative, further embodiments may include that storing electricity generated by the electric generator using a power source electrically connected to the electric generator and the variable area turbine control system. The variable area turbine control system is electrically connected to the electric generator through the power source.

In addition to one or more of the features described above, or as an alternative, further embodiments may include that the power source is at least one of the following: a battery; a capacitor; a supercapacitor; and an ultracapacitor.

In addition to one or more of the features described above, or as an alternative, further embodiments may include that the variable area turbine control system is directly electrically connected to the electric generator.

In addition to one or more of the features described above, or as an alternative, further embodiments may include controlling operation of the variable area turbine control system using a controller operably coupled to the electric generator and the variable area turbine control system.

In addition to one or more of the features described above, or as an alternative, further embodiments may include that the controller is a full authority digital engine control (FADEC).

In addition to one or more of the features described above, or as an alternative, further embodiments may include storing electricity generated by the electric generator using a power source electrically connected to the electric generator, the variable area turbine control system, and the controller. The variable area turbine control system is electrically connected to the electric generator through the power source.

In addition to one or more of the features described above, or as an alternative, further embodiments may include that the electric generator is connected to an engine accessory gearbox that is operably coupled to the high speed spool.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
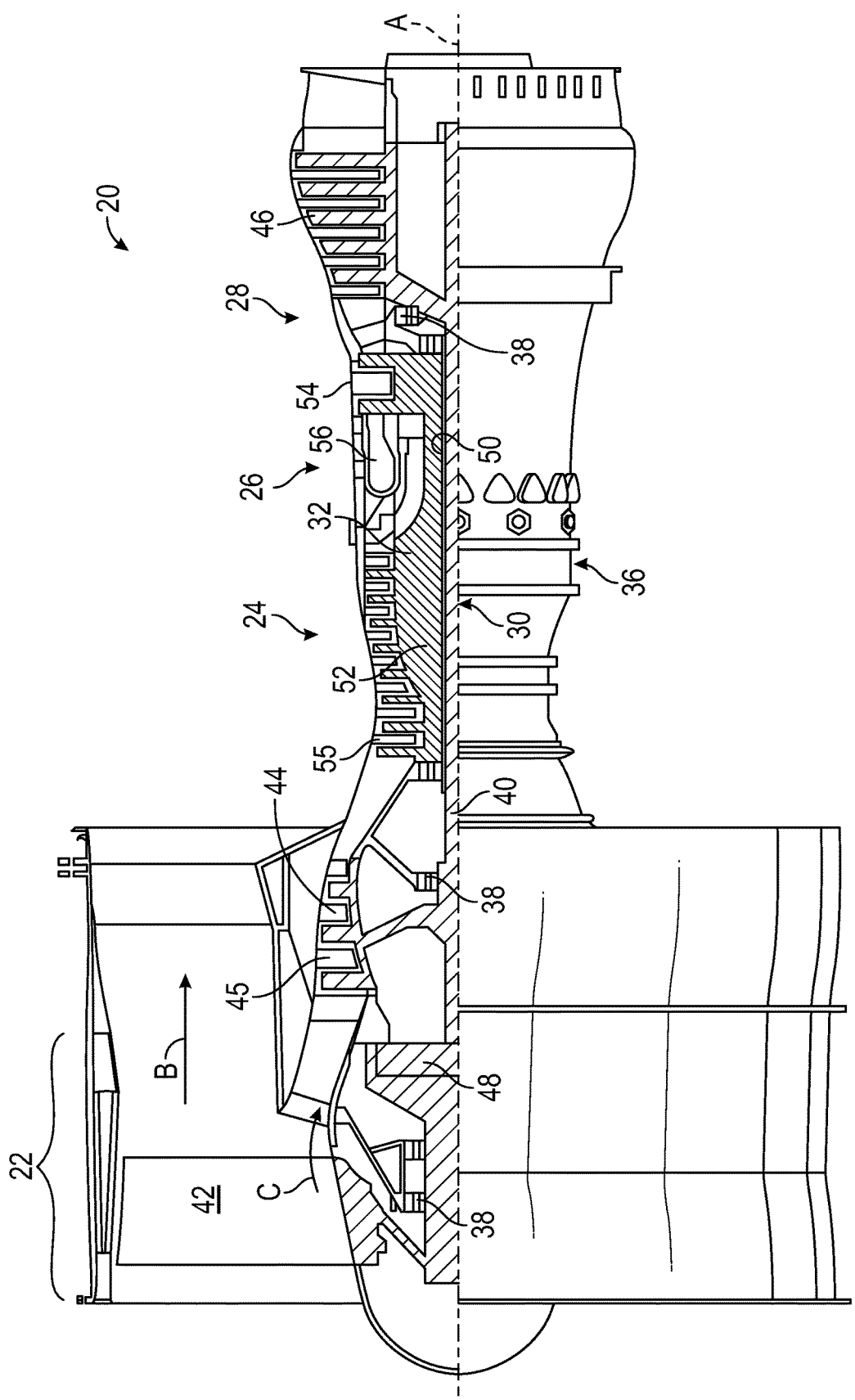
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (' TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
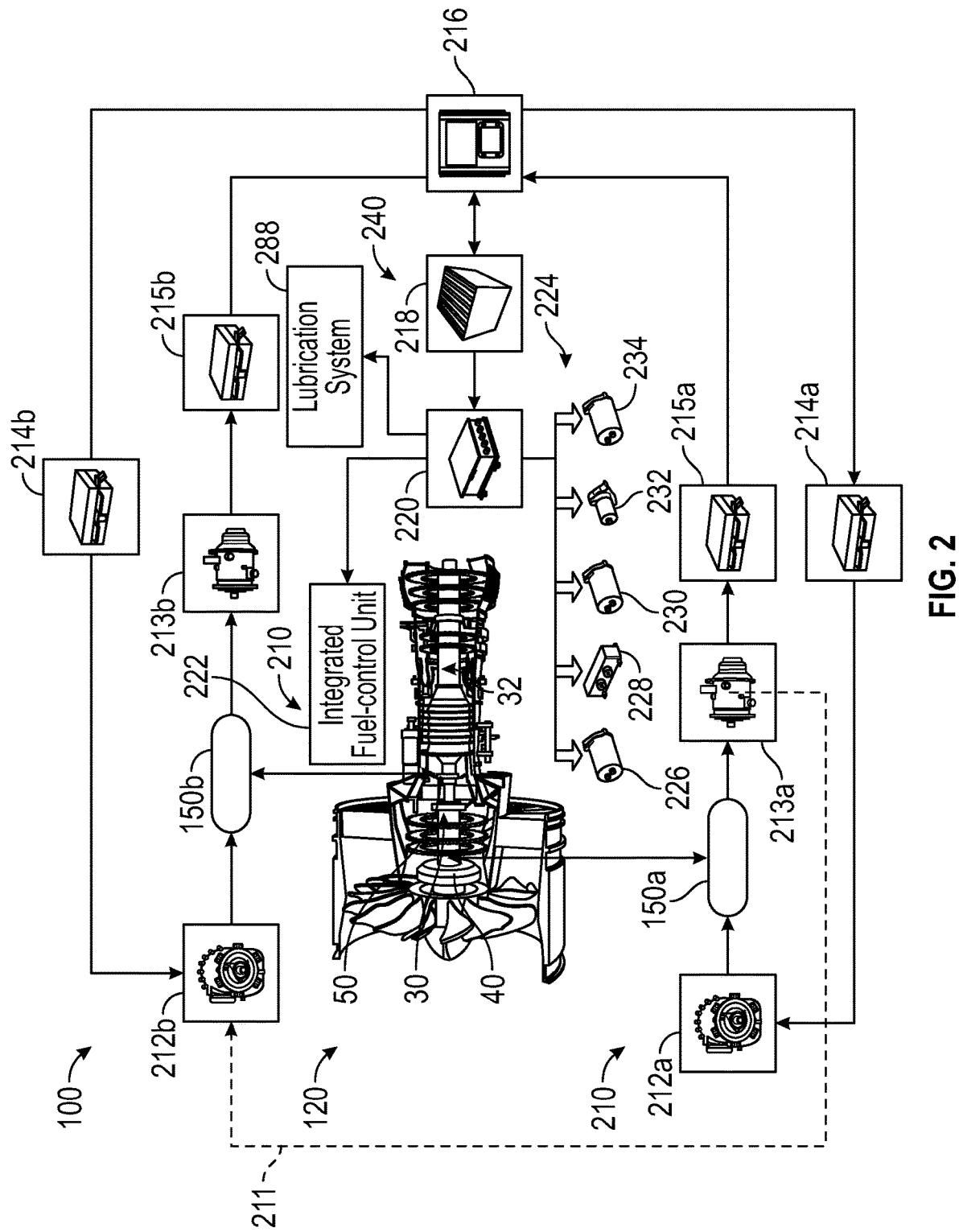
FIG. 2 is a schematic diagram of a hybrid electric propulsion system or hybrid electric engine with physical power flow connections (electrical and mechanical power), in accordance with an embodiment of the disclosure.

FIG. 2 illustrates a hybrid electric propulsion system 100 (also referred to as hybrid gas turbine engine or hybrid electric engine 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212B for rotation of the high speed spool as discussed below) or additional electric motors (not depicted). The electrical power system 210 can also include a first electric generator 213A configured to convert rotational power of the low speed spool 30 to electricity and a second electric generator 213B configured to convert rotational power of the high speed spool 32 to electricity. Although two electric generators 213A, 213B are depicted in FIG. 2, it will be understood that there may be only a single electric generator (e.g., only electric generator 213A) or additional electric generators (not depicted). In some embodiments, one or more of the electric motors 212A, 212B can be configured as a motor or a generator depending upon an operational mode or system configuration, and thus one or more of the electric generators 213A, 213B may be omitted.

In the example of FIG. 2, the mechanical power transmission 150A can include a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a capacitor, a supercapacitor, an ultracapacitor, and the like. The energy storage management system 216 can facilitate various power transfers within the hybrid electric propulsion system or hybrid electric engine 100. For example, power from the first electric generator 213A can be transferred 211 to the second electric motor 212B as a low speed spool 30 to high speed spool 32 power transfer. Other examples of power transfers may include a power transfer from the second electric generator 213B to the first electric motor 212A as a high speed spool 32 to low speed spool 30 power transfer.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a plurality of actuators 224, such as one or more of a low pressure compressor bleed valve actuator 226, a low pressure compressor vane actuator 228, a high pressure compressor vane actuator 230, an active clearance control actuator 232, a variable area turbine actuator 234, and other such effectors. In some embodiments, the low pressure compressor vane actuator 228 and/or the high pressure compressor vane actuator 230 can be omitted where active control of stator vanes 45, 55 of FIG. 1 is not needed. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, actuators 224 and/or other elements (not depicted).

Figure 3:
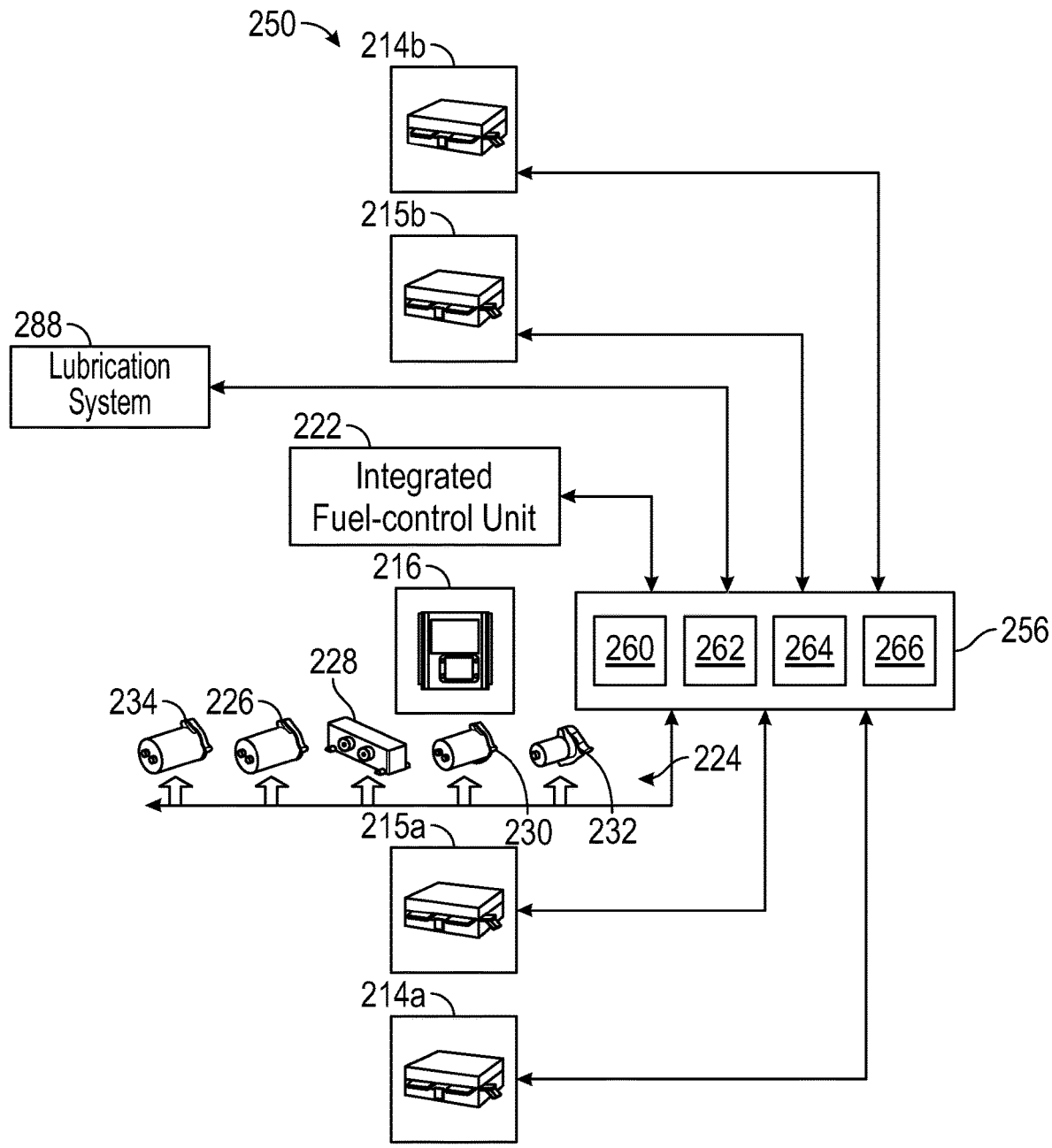
FIG. 3 is a schematic diagram of control signal paths of a hybrid electric propulsion system or hybrid electric engine, in accordance with an embodiment of the disclosure.

FIG. 3 is a schematic diagram of control signal paths 250 of the hybrid electric propulsion system or hybrid electric engine 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a power transfer control 266 that controls the hybrid electric system control effectors 240 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. The controller 256 provides a means for controlling the hybrid electric system control effectors 240 based on a power transfer control 266 that is dynamically updated during operation of the hybrid electric propulsion system or hybrid electric engine 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, and the like can be used to establish operational schedules and transition limits to maintain efficient operation of the gas turbine engine 120.

Figure 4:
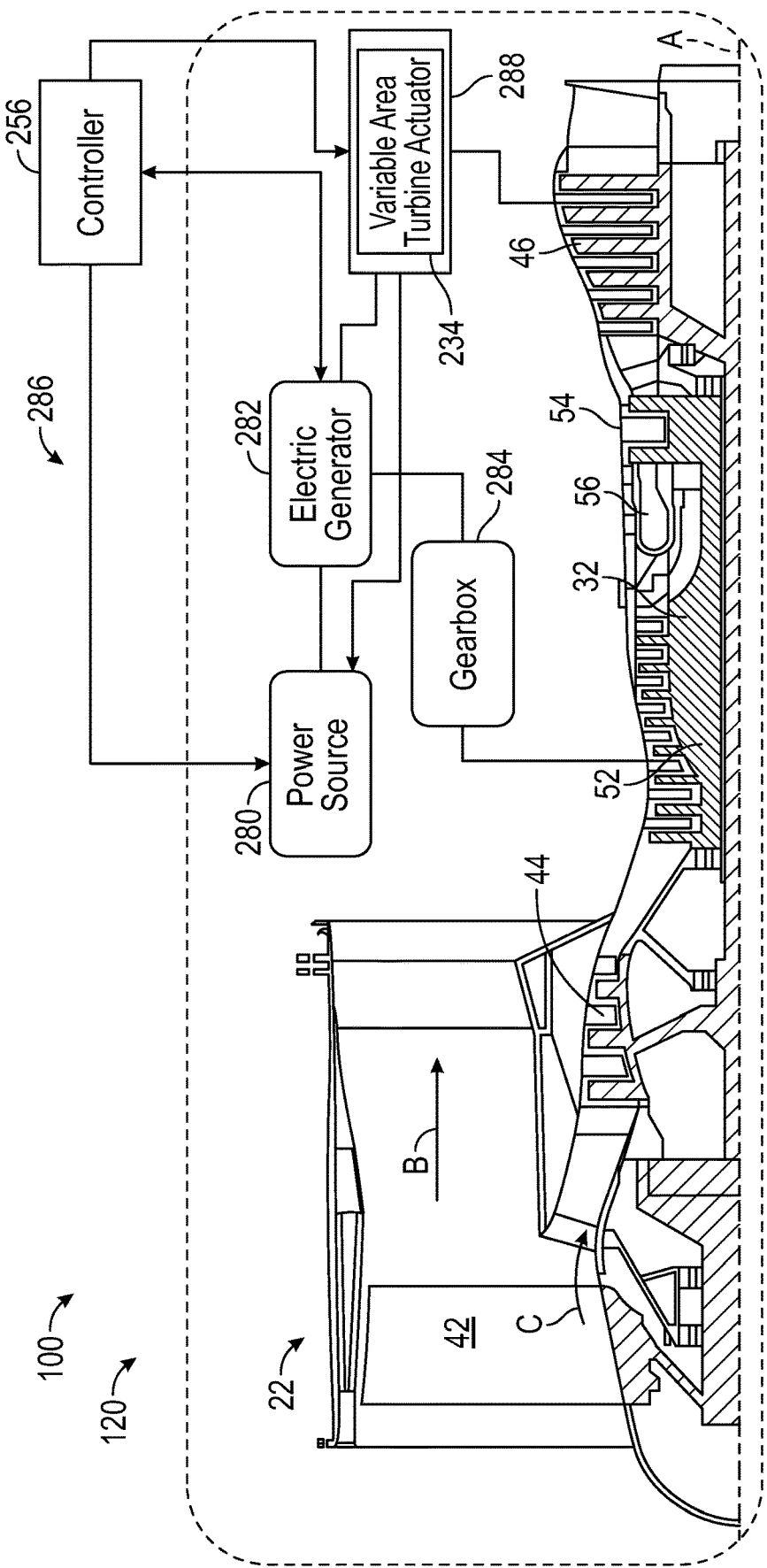
FIG. 4 is a partial cross-sectional illustration of a hybrid electric propulsion system or hybrid electric engine, with a variable area turbine control system in accordance with an embodiment of the disclosure.

Referring now to FIG. 4, a hybrid electric propulsion system 100 (also referred to as hybrid gas turbine engine or hybrid electric engine 100) including a gas turbine engine 120 operably coupled to an electrical power system 210 as part of a hybrid electric aircraft in accordance with one non-limiting embodiment of the present disclosure is illustrated. In this embodiment, the engine 120 has a power source 280 such as a battery, a capacitor, a supercapacitor, an ultracapacitor or an equivalent thereof, which receives power to from an electric generator 282, which is connected to an engine accessory gearbox 284 that is operably coupled to the high speed spool 32. In other words, the accessory gearbox 284 will have at least one component (e.g., a gear train or other equivalent device) operably coupled to the high speed spool 32 and the electric generator 282 such that operation of the high speed spool 32 will rotate the component which in turn will rotate the electric generator 282. The power source 280 is configured to store electricity generated by the electric generator 282. The power source 280 is electrically connected to the electric generator 282 and the variable area turbine control system 288.

In one non-limiting embodiment, electric generator 282 may be the electric generator 213B of the embodiment illustrated in FIG. 2, which is configured to generate electricity from rotation of the high speed spool 32.

In an alternative embodiment, electric generator 282 may be operatively coupled to the low speed spool 30 via the accessory gearbox 284. In another non-limiting embodiment, electric generator 282 may be electric generator 213A of the embodiment illustrated in FIG. 2, which is configured to generate electricity from rotation of the low speed spool 30.

The hybrid electric engine 100 includes a variable area turbine control system 288 electrically connected to the power source 280 and/or the electric generator 282. The variable area turbine control system 288 may be directly electrically connected to the electric generator 282 or connected to electric generator 282 through the power source 280. The variable area turbine control system 288 includes a variable area turbine actuator 234. In an embodiment, the variable area turbine actuator 234 is configured to be powered only by electricity generated by the electric generator 282 and will not require electricity from any other source on the aircraft, which advantageously allows the variable area turbine actuator 234 to not be an electrical power drain on other aircraft power sources. As will discussed below, the variable area turbine control system 288 is configured to adjust the cross-sectional area of the core flow path C of the hybrid electric engine 100, thus increasing or decreasing core airflow through the core flow path C of the hybrid electric engine 100. The ability to increase or decreases core airflow through the core flow path C of the hybrid electric engine 100 is advantageous because it allows the hybrid electric engine 100 to spoil engine thrust independent of fuel flow to combustor 56 of the hybrid electric engine 100.

The controller 256 is operably coupled with the electric generator 282 and the variable area turbine control system 288. The controller 256 is in electronic communication with the electric generator 282 and the variable area turbine control system 288. The controller 256 may also be operably coupled with the power source 280. The controller 256 may also be in electronic communication with the power source 280. In an embodiment, the controller 256 may be a FADEC. The controller 256 may be configured to operate or control operation of the variable area turbine control system 288 and more specifically the variable area turbine actuator 234.

Figure 5:
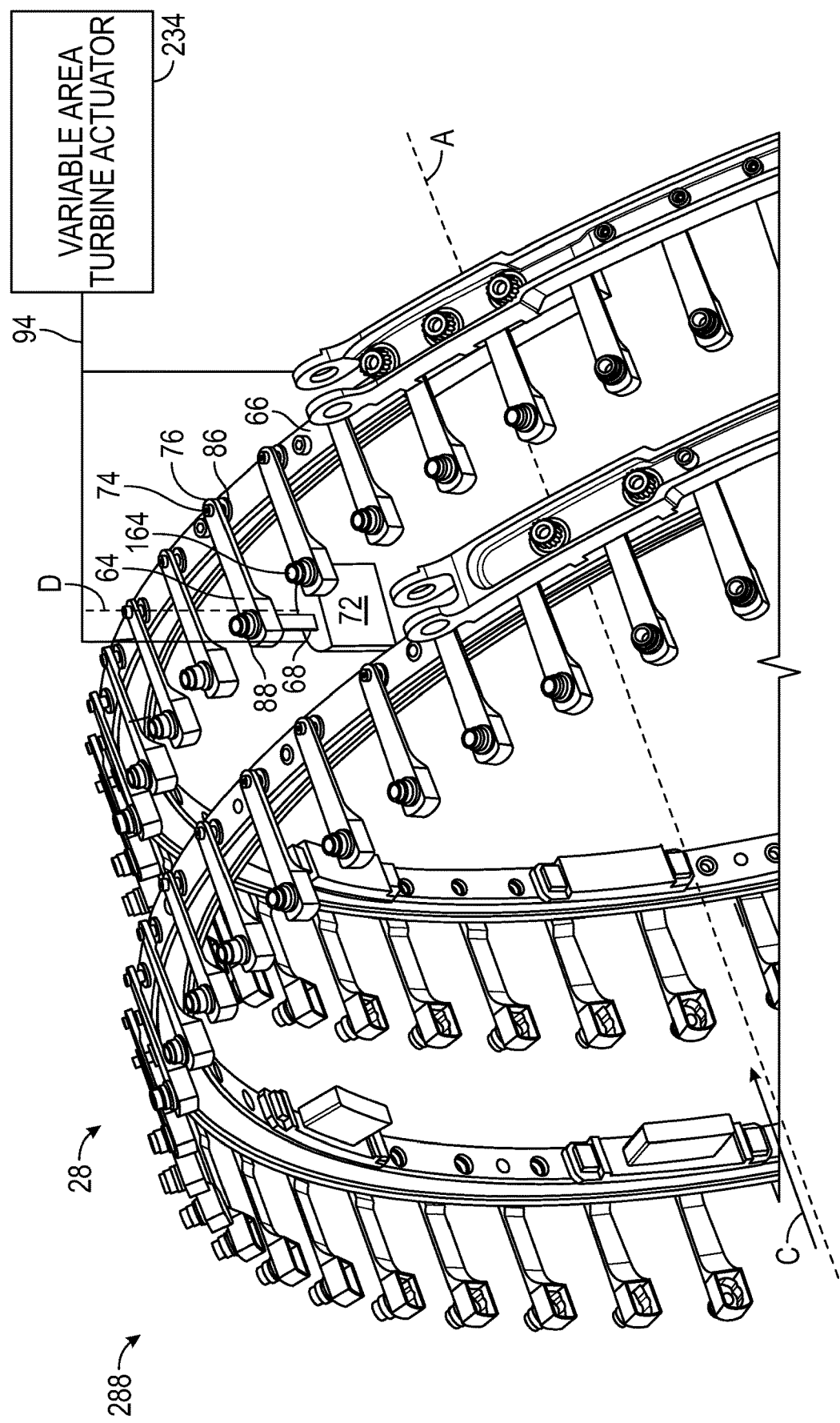
FIG. 5 is an isometric view of a turbine section of the hybrid electric propulsion system or hybrid electric engine with the variable area turbine control system in accordance with an embodiment of the disclosure.

Referring now to FIG. 5, with continued reference to FIGS. 1-4, variable area turbine control system 288 is illustrated in accordance with an embodiment of the present disclosure.

FIG. 5 illustrates variable area turbine control system 288 configured to adjust a cross-sectional area of the core flow path C within a turbine section 28 of the hybrid electric engine 100 using a plurality of variable turbine vanes 72. The variable turbine vanes 72 are static vanes, meaning that the variable turbine vanes 72 do not rotate around the engine central longitudinal axis A. The variable turbine vanes 72 only rotate around a vane stem axis D. The variable area turbine control system 288 includes a vane arm 64. It is understood that while only one variable turbine vane 72 is illustrated in FIG. 5 for simplicity, the variable area turbine control system 288 includes one variable turbine vane 72 for each vane arm 64.

The vane arm 64 is operably couped to an actuation ring 66. It is understood that although discussed as a single actuation ring 66, the actuation ring 66 may be composed of multiple components integrally formed or connected. Rotating the actuation ring 66 circumferentially about the engine central longitudinal axis A moves the vane arm 64 to pivot a vane stem 68, and an associated variable turbine vane 72. The vane stem 68 is pivoted around the vane stem axis D. The vane arm 64 is used to manipulate variable turbine vanes 72 in the turbine section 28 of the hybrid electric engine 100.

The variable area turbine actuator 234 is configured to rotate the variable turbine vane 72 around a vane stem axis D to adjust the cross-sectional area of the core flow path C within a turbine section 28 of the hybrid electric engine 100. The vane stem axis D extends from the central engine longitudinal axis A radially outward through the vane stem 68. The vane stem axis D may be located central to the vane stem 68.

In an embodiment, the variable area turbine actuator 234 is an electromechanical actuator. The variable area turbine actuator 234 is operably connected to the actuation ring 66 through a series of mechanical linkages 94. The mechanical linkages 94 may include a bell crank that is operably attached to the variable area turbine actuator 234. The bell crank may penetrate the turbine case to drive the actuation rings 66, which moves the individual variable turbine vanes 72. In the embodiment illustrated in FIG. 5, the variable area turbine actuator 234 is configured to rotate the actuation rings 66 circumferentially about the engine central longitudinal axis A through the series of mechanical linkages 94, which moves the vane arm 64 to pivot the vane stem 68, and an associated variable turbine vane 72. A pin 74 is operably connected to the vane arm 64 at a first end 76 of the vane arm 64. The pin 74 operably connects the vane arm 64 to the actuation ring 66 and allows the pin 74 and vane arm 64 rotate together. The pin 74 is radially received within a sync ring bushing 86, which is received within a sleeve (not shown) within the actuation (or sync) ring 66. The bushing 86 permits the pin 74 and the vane arm 64 to rotate together relative to the actuation ring 66. As illustrated in FIG. 5, the pin 74 may be oriented relative to the vane arm 64 such that the pin 74 extends radially toward the central engine longitudinal axis A.

The vane stem 68 is secured to a second end 88 of the vane arm 64 opposite the first end 76. The vane stems 68 may be secured to the second end 88 via a fastening mechanism 164. The fastening mechanism 164 may be a nut. The vane arm 64 and vane stem 68 rotate in unison.

It is understood that the overall configuration and components of the vane arm 64, the pin 74, the bushing 86, the actuation ring 66, and the fastening mechanism 164 are but one example and the variable area turbine actuator 234 may be utilized with other similar mechanisms to rotate turbine vanes 72.

Figure 6:
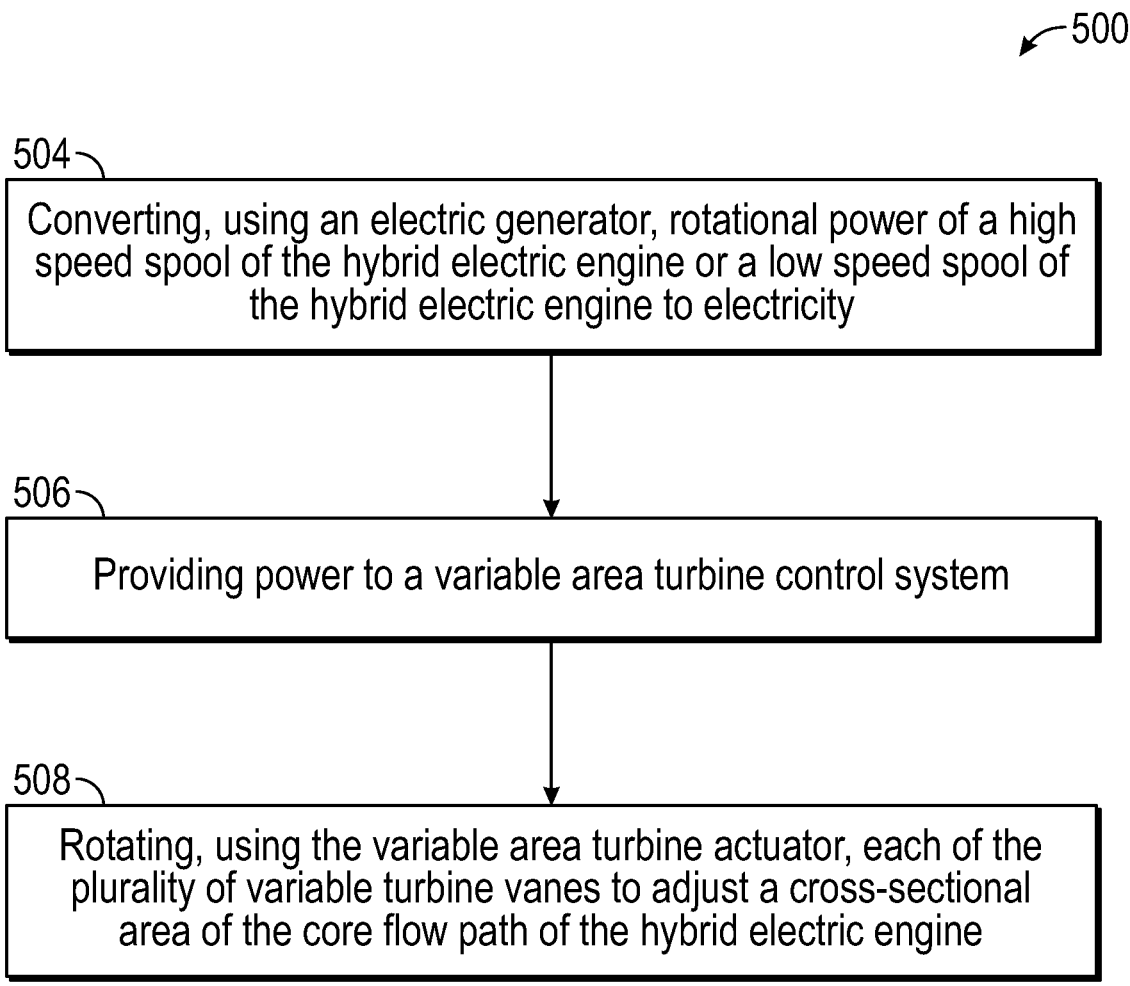
FIG. 6 is a diagram of a method of controlling airflow through a core flow path of a gas turbine engine, showing operations of the method, according to an embodiment of the present disclosure.

Referring now to FIG. 6 with continued reference to FIGS. 1-5. FIG. 6 illustrated a method 500 of managing airflow through a core flow path C of a hybrid electric engine 100 for an aircraft.

At block 504, an electric generator 282 converts rotational power of a high speed spool 32 of the hybrid electric engine 100 or a low speed spool 30 of the hybrid electric engine 100 to electricity.

At block 506, power is provided to a variable area turbine control system 288. The variable area turbine control system 288 includes: a plurality of variable turbine vanes 72 located in a turbine section 28 of the hybrid electric engine 100 and a variable area turbine actuator 234.

At block 508, the variable area turbine actuator 234 rotates each of the plurality of variable turbine vanes 72 to adjust a cross-sectional area of the core flow path C of the hybrid electric engine 100. In an embodiment, the variable area turbine actuator 234 is an electromechanical actuator.

The method 500 may further comprise that the controller 256 commands delivery of enough fuel to the hybrid electric engine 100 during a taxi of the aircraft to maintain a minimum fuel flow requirement for the hybrid electric engine 100 and the variable area turbine actuator 234 rotates each of the plurality of variable turbine vanes 72 to increase the cross-sectional area of the core flow path C through the turbine section 28 of the hybrid electric engine 100 to reduce the compressor operating line, thereby improving idle stability and allowing for reduced idle thrust. Better matching the turbine area to the compressor operation line at take-off may also be used to manage temperatures and improve durability.

The method 500 may further comprise that electricity generated by the electric generator 282 using a power source 280 electrically connected to the electric generator 282 and the variable area turbine control system 288. The variable area turbine control system 288 is electrically connected to the electric generator 282 through the power source 280.

While the above description has described the flow process of FIG. 5 in a particular order, it should be appreciated that unless otherwise specifically required in the attached claims that the ordering of the steps may be varied.

As used herein radially outward is intended to be in the direction away from the engine central longitudinal axis A.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A hybrid electric engine comprising:
 a gas turbine engine comprising a low speed spool, a high speed spool, a fan section, a compressor section, a combustor section, and a turbine section, the low speed spool comprising a low pressure compressor and a low pressure turbine, and the high speed spool comprising a high pressure compressor and a high pressure turbine;

an electric generator configured to convert rotational power of the high speed spool or the low speed spool to electricity; and a variable area turbine control system electrically connected to the electric generator, the variable area turbine control system being configured to adjust a cross-sectional area of a core flow path of the hybrid electric engine, the variable area turbine control system comprising:

a plurality of variable turbine vanes located in the turbine section; and a variable area turbine actuator configured to rotate each of the plurality of variable turbine vanes to adjust the cross-sectional area of the core flow path of the hybrid electric engine, wherein the variable area turbine actuator is an electromechanical actuator; and a power source electrically connected to the electric generator and the variable area turbine control system, wherein the variable area turbine control system is electrically connected to the electric generator through the power source and the power source being one of a battery; a capacitor; a supercapacitor; and an ultracapacitor;

wherein the variable area turbine actuator is configured to be powered only by electricity generated by the electric generator; and a controller operably coupled to the electric generator and the variable area turbine control system, wherein the controller is configured to operate the variable area turbine control system and the controller is configured to rotate, using the variable area turbine actuator, each of the plurality of variable vanes to decrease the cross-sectional area of the core flow path through the turbine section of the hybrid electric engine to spoil engine thrust from the hybrid electric engine.

2. The hybrid electric engine of claim 1, wherein the controller is a full authority digital engine control (FADEC).

3. The hybrid electric engine of claim 1, wherein the electric generator is connected to an engine accessory gearbox that is operably coupled to the high speed spool.

4. The hybrid electric engine of claim 1, wherein the electric generator is connected to an engine accessory gearbox that is operably coupled to the low speed spool.

5. A method for managing airflow through a core flow path of a hybrid electric engine for an aircraft, the method comprising:

converting, using an electric generator, rotational power of a high speed spool of the hybrid electric engine or a low speed spool of the hybrid electric engine to electricity;

storing electricity generated by the electric generator using a power source electrically connected to the electric generator and a variable area turbine control system, wherein the variable area turbine control system is electrically connected to the electric generator through the power source, the power source being one of a battery; a capacitor; a supercapacitor; and an ultracapacitor;

providing power to the variable area turbine control system from the power source, the variable area turbine control system comprising: a plurality of variable turbine vanes located in a turbine section of the hybrid electric engine and a variable area turbine actuator;

rotating, using the variable area turbine actuator, each of the plurality of variable turbine vanes to adjust a cross-sectional area of the core flow path of the hybrid electric engine, wherein the variable area turbine actuator is an electromechanical actuator; and delivering enough fuel to the hybrid electric engine during a taxi of the aircraft to maintain a minimum fuel flow requirement for the hybrid electric engine; and rotating, using the variable area turbine actuator, each of the plurality of variable vanes to decrease the cross-sectional area of the core flow path through the turbine section of the hybrid electric engine to spoil engine thrust from the hybrid electric engine.

6. The method of claim 5, further comprising:

controlling operation of the variable area turbine control system using a controller operably coupled to the electric generator and the variable area turbine control system.

7. The method of claim 6, wherein the controller is a full authority digital engine control (FADEC).

8. The method of claim 5, wherein the electric generator is connected to an engine accessory gearbox that is operably coupled to the high speed spool.

* * * * *